United States Patent [19]

Näslund et al.

[11] 4,014,266
[45] Mar. 29, 1977

[54] TRANSPORT TRACK AND SLIDING CARRIAGE FOR MOVING HEAVY LOADS

[75] Inventors: Sören Näslund, Lidkoping; Gösta Martin Bohm, Vasteras, both of Sweden

[73] Assignee: Paul Anderson Industrier AB, Vasteras, Sweden

[22] Filed: Sept. 25, 1975

[21] Appl. No.: 616,531

[30] Foreign Application Priority Data

Oct. 4, 1974 Sweden .......................... 7412554

[52] U.S. Cl. .............................. 104/162; 104/134; 104/147 R; 105/31; 193/38; 254/105
[51] Int. Cl.² ..................................... B61B 13/08
[58] Field of Search ......... 104/48, 88, 134, 147 R, 104/154, 162; 105/31; 193/38, 41; 254/35, 36, 37, 105, 106, 107; 308/3 R

[56] References Cited

UNITED STATES PATENTS

| | | | |
|---|---|---|---|
| 3,033,525 | 5/1962 | Johnson | 104/162 X |
| 3,105,583 | 10/1963 | Svensson | 193/38 |
| 3,373,971 | 3/1968 | Chambers et al. | 254/107 |
| 3,464,095 | 9/1969 | Chambers | 254/107 X |
| 3,486,737 | 12/1969 | Campbell | 254/106 |
| 3,498,685 | 3/1970 | Popunski | 308/312 |
| 3,559,954 | 2/1971 | Chambers et al. | 254/106 |
| 3,659,823 | 5/1972 | Griffin | 254/105 X |
| 3,832,945 | 9/1974 | Muto et al. | 104/162 X |

*Primary Examiner*—Robert J. Spar
*Assistant Examiner*—Randolph A. Reese
*Attorney, Agent, or Firm*—Sughrue, Rothwell, Mion, Zinn & Macpeak

[57] ABSTRACT

A transport track and a sliding carriage for transporting heavy loads in substantially horizontal direction. The track comprising a bottom plate intended to be positioned loosely on a support capable to bear heavy loads. The upper surface of the plate and the lower surface of the sliding carriage being designed so as to provide minimum resistance to the movement of the sliding carriage over the surface. At least one rod is attached to the bottom plate which rod is adapted for cooperation with a climbing jack intended for moving the carriage and with a guide groove in the carriage for guiding the carriage during the movement. Structure is also arranged for transferring axial forces arising in the rod to the bottom plate.

7 Claims, 4 Drawing Figures

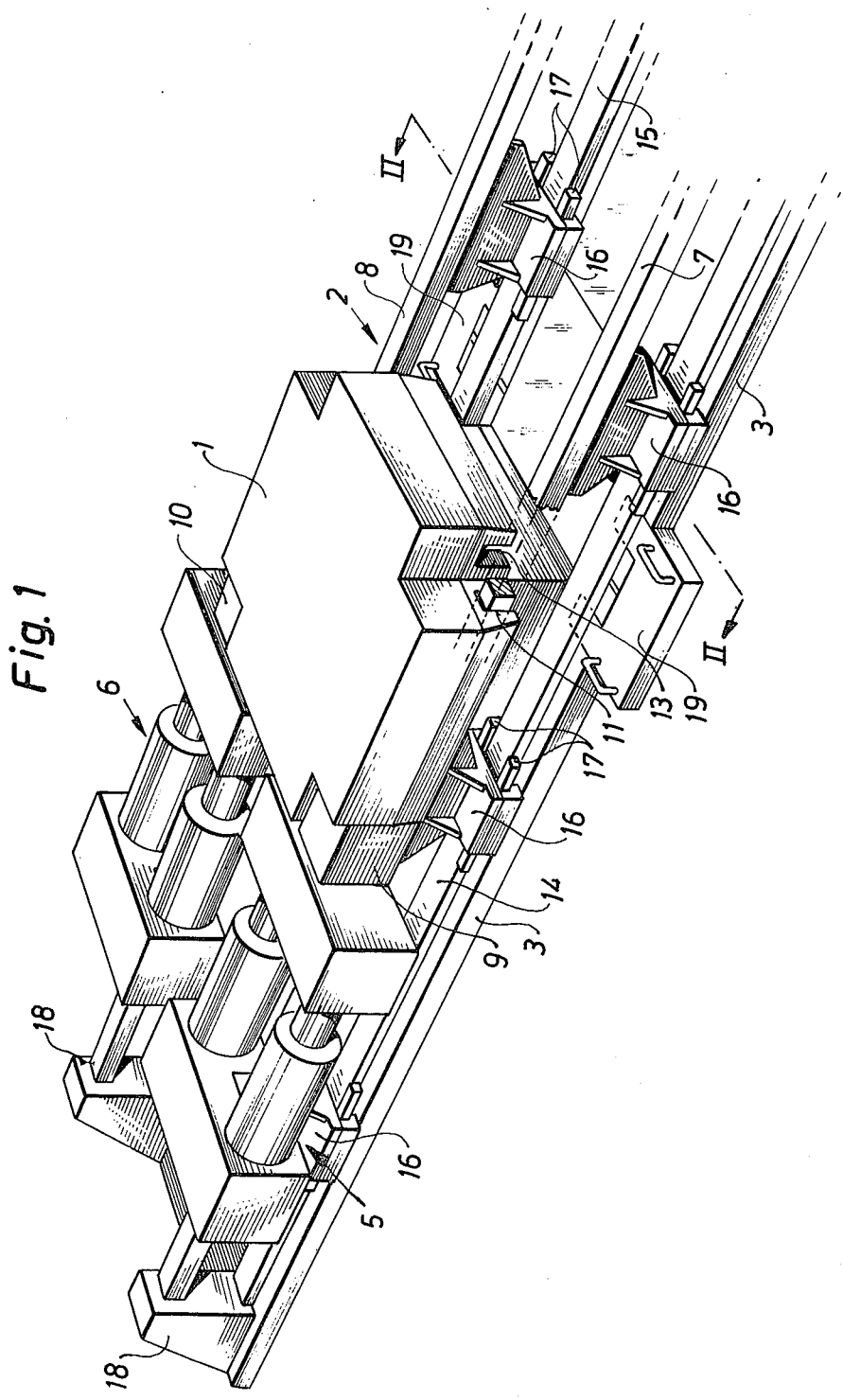

TRANSPORT TRACK AND SLIDING CARRIAGE FOR MOVING HEAVY LOADS

This invention relates to a transport track intended to co-operate with a carriage slidable along the same for moving heavy loads in substantially horizontal direction and to a sliding carriage for use in connection with the transport track.

Oil drilling platforms usually are manufactured in sections built on units, which are movable along tracks extending to a barge. Each of the legs of the platform preferably is supported on such a unit. The production rate for the different sections can vary, and the request of their delivery to different oil deposits can be changed during the manufacture. It is therefore necessary to provide possibilities for the sections disposed along said track and being manufactured to pass each other. Known units on wheels for transporting the platform sections have a clear disadvantage, because they cannot in a simple manner be adjusted so as to move angularly to the original direction of movement. This would require the lifting of the entire units with the platform section by means of jacks for setting the wheels in the new direction. The loads represented by these platform sections, besides, are very heavy and require a great number of wheels, which complicates to a high degree the construction of said units and also of the tracks necessary for co-operation therewith.

It is a main object of the invention to provide an arrangement for transporting heavy loads in substantially horizontal direction, at which arrangement among others the aforesaid disadvantages are eliminated.

This object is achieved according to the invention by utilizing a transport track and co-operating therewith a sliding carriage, which is intended to be moved over the transport track by using at least one climbing jack co-operating with a rod provided along said track, in such a manner, that the axial forces arising in said rod are transferred down into the bottom plate of the transport track. By utilizing a carriage sliding on the transport track it is possible simply to change the direction of movement without having to take any special measures other than changing the direction of the force required for moving the carriage. The contact surfaces between the sliding carriage and transport track preferably are provided with a slip coat for minimizing the friction. The sliding carriage, further, preferably is provided with means co-operating with said rod for guiding the sliding carriage.

At a preferred embodiment a combined climbing rod and guide rod is provided on each side of the transport track, so that for the transport track as well as for the sliding carriage unbroken contact surfaces are obtained which are of maximum size in relation to the dimensions given for the track and the carriage. Due to the fact that according to the invention the axial forces arising in said rods are transferred down to the bottom plate, the plate with climbing rods, jacks and sliding carriage acts as one unit, which can be positioned loosely on the support, because forces resulting from the sliding carriage movement will not act upon the ambient — except the vertical forces caused by the load. It is, therefore, suitable to design the bottom plate as a section to be connected with similar sections to form a track of desired extension. The sections can be positioned loosely on the support and be jointed one to the other for transferring compressive and tensile forces between the units. It will thereby be possible to transport objects through relatively long distances by utilizing only a few sections, which are rearranged as the work proceeds. By means of such plate sections also diverging tracks which, for example, form an angle of 90° with the main track, and curved tracks can simply be established.

The term "climbing jack" used above and in the following descriptive part as well as in the claims is to be understood as a known means of the kind capable to move in steps along a climbing rod. This type of jacks usually is applied to move heavy loads in vertical direction, in which case the climbing rods co-operating with the climbing jacks are arranged vertically and stayed by suitable supporting structures. It is, however, also possible to utilize this type of means for transporting heavy loads in e.g. horizontal direction by arranging the climbing rods horizontally.

The characterizing features of the invention become apparent from the attached claims.

The invention is described in greater detail in the following, with reference to the embodiment shown by way of example in the accompanying drawings.

FIG. 1 is a perspective view of a transport track and a sliding carriage according to the invention attached thereon.

FIG. 2b is an enlarged section of the carriage corner circled in FIG. 2a.

Figure 2A:
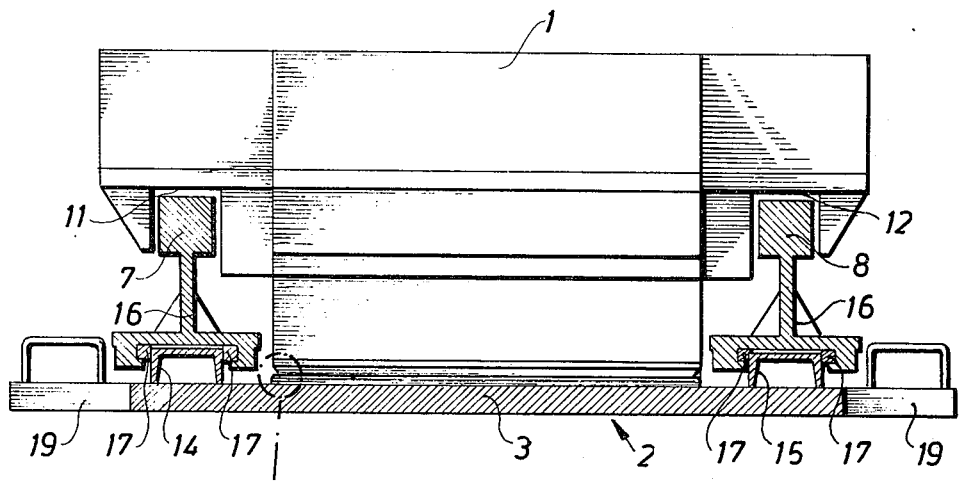
FIG. 2a is a sectional view along the line II—II in FIG. 1.

Referring to FIGS. 1 and 2, 1 designates a sliding carriage intended to carry a desired load and be moved along a transport track 2. The transport track 2 is assembled on bottom plates 3, the upper surfaces of which are covered with a suitable material, which together with the material on the slip surface of the sliding carriage produces a minimum of friction. An example of a suitable material combination is PVC-material and smooth-polished stainless sheet metal. At the embodiment shown, the PVC-material is attached to the plates 3 in the form of exchangeable plates 4 which are stiffened by thin plates 20. Said plates 20 are slightly offset in longitudinal direction relative to the PVC-material so that a certain overlapping at the joints between the plates and the PVC-material is obtained and thereby the risk is eliminated that the cover plates will be pushed ahead of the sliding carriage.

For moving the sliding carriage 1 along the track 2, two climbing jacks 5 and 6 are applied which co-operate with two longitudinal climbing rods 7 and, respectively, 8 arranged along the lateral edges of the bottom plates 3. The jacks 5 and 6 act upon the sliding carriage 1 via distance pieces 9 and, respectively, 10 guided by the climbing rods. The rods 7 and 8 serve also as guide rods for the sliding carriage 1 and are for this purpose provided with guide grooves 11 and 12 disposed along their lateral edges to co-operate with the rods 7 and, respectively, 8. In order to also render possible transport in lateral direction, the sliding carriage is provided with guide grooves 13, which form angles with the grooves 11 and, respectively, 12. At the embodiment shown, said grooves form right angles with each other, but they may also form any other desired angle. The guide grooves in the sliding carriage can also be arranged adjustable in desired directions relative to the sliding carriage. It should be observed that the rods 7 and 8 are not intended to carry any part of the weight of the sliding carriage or load, but only serve as guidance for the sliding carriage. There is, therefore, a small clearance between the upper surface of the rods and the horizontal defining surfaces of the grooves in the sliding carriage 1. The rods 7 and 8 are detachably fastened on beams 14 and, respectively, 15, which are arranged along the lateral edges of the bottom plates 3, by means of supporting shoes 16, which are intended to be moved and thereby be caused to engage over locking blocks 17 provided on the lateral surfaces of the beams 14 and 15.

At the embodiment shown where the climbing jacks 5 and 6 are intended to push the sliding carriage 1 ahead of them, the rods 7 and 8 will be subjected to compressive forces, which via end stop members 18 are transferred down into the bottom plate 3. The buckling risk for the rods 7 and 8 is eliminated due to the connections of said rods with the beams 14 and 15 by the shoes 16. As the forces required for moving the sliding carriage are returned to the bottom plate 3, no forces resulting from the movement of the sliding carriage will act upon the ambient and, therefore, said plates can be positioned loosely on a support having sufficient bearing capacity, preferably a concrete foundation. It is among others, this circumstance that permits the simple dividing of the bottom plate into several sections, which are jointed together by connecting plates 19 of yoke shape transferring tensional stresses between the different plate sections. The rods 7 and 8 can be attached end to end, preferably guided by a pin, as they only are intended to transfer compressive forces to each other.

Figure 2B:
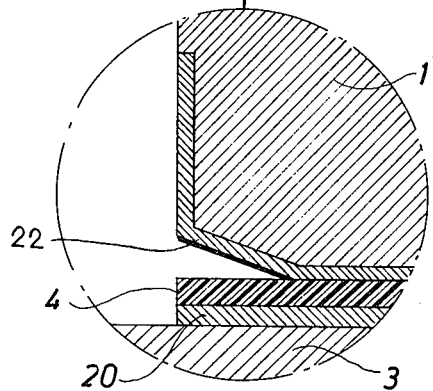

FIG. 2B illustrates, in addition to the attachment of the PVC-coat 4 on a plate 20 provided on the bottom plate 3, that the slip surface of the sliding carriage is covered with stainless sheet metal 22, and that this surface has bevelled edges in order to facilitate movement in different directions. It is also possible to interchange the coverings on the slip surfaces, so that the bottom plate 3 is provided with stainless sheet metal and the lower surface of the sliding carriage 1 with a PVC-coat.

Owing to the possibility of dividing the transport track into a plurality of sections, a sliding carriage can be transported an arbitrary distance by utilizing only a few sections, which are re-arranged as the transport proceeds. In this connection it is only required that the stop members 18 are advanced in steps as the sliding carriage movement proceeds. Thereafter, unemployed plate sections with climbing rods can be removed from the final end of the track and positioned loosely ahead of the first section and connected to an adjacent section by means of connecting plates 19. It is also possible so to design the track sections that curved tracks are obtained.

Figure 3:
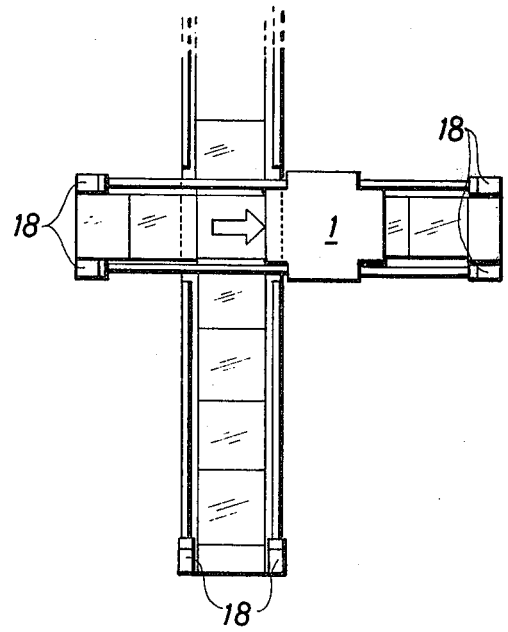
FIG. 3 is a horizontal view of the transport track with diverging track.

In FIG. 3 a case is schematically shown at which it is desirable to temporarily move a sliding carriage 1 onto a diverging track in order to permit another sliding carriage to pass on the main track. This arrangement requires only a number of plate sections with climbing rods be positioned angularly to the main track. When then the sliding carriage 1 has arrived at the crossing point of the two tracks, the combined climbing and guide rods 7 and, respectively, 8 with associated beams 14 and, respectively, 15 are removed on a distance corresponding to the width of the diverging track. Furthermore, at least one section or a part thereof must be provided on the opposite side of the main track and directly in front of the divergent track, to which section the climbing rods required for the sliding carriage movement in lateral direction can be attached and into which the axial forces arising in said rods can be transferred down. When the other sliding carriage has passed, the sliding carriage 1 again can be moved onto the main track by utilizing the jacks cooperating with the rods arranged along the diverging track. In this connection the stop members 18 located to the right in the Figure serve as means for transferring the axial forces down into the bottom plate. It is also possible by special design of the plate sections to form another desired angle between the diverging track and main track. At the lateral movement of the sliding carriage 1, thus, the guide grooves 13 arranged perpendicularly to the guide grooves 11 and 12 in the sliding carriage are utilized for cooperation with the guide rods arranged angularly to the main track.

An arrangement according to above can be utilized for the transport of any loads. For broad objects or such having spaced apart supporting points, for example oil drilling platforms, several tracks each carrying one or more sliding carriages are arranged in parallel to the side of each other, and the jacks intended for moving the sliding carriages are driven synchronously with each other, preferably from a pressure medium source common to all jacks.

The embodiment described above is to be regarded only as a preferred embodiment of the invention, which can be varied in several respects. It is, for example, also possible to arrange the jacks so that they pull the sliding carriage along the track. In order to still more reduce the friction between the sliding carriage and bottom plate, pressure fluid can be supplied to the contact surface between the sliding carriage and the plate. The fluid can be selected according to the materials in the slip surfaces and may, for example, be air, oil or water. The arrangement of the climbing rods may also be varied as desired, for example in such a manner that the two rods shown in the drawing can be exchanged against one central rod running through a central guide groove in the sliding carriage. The embodiment with the climbing rods arranged along the lateral edges of the track always implies the advantage of providing an undivided slip surface with a maximum width in relation to the track width. Also the way how the axial forces in the climbing rods are transferred down to the bottom plates can be varied as desired, for example through the supporting shoes intended to stay the rods. Said shoes then must be anchored in the beams attached to the bottom plates. To the extent the pin connections between the climbing rods should prove insufficient for receiving the vertical forces obtained as a result of the compressive forces acting eccentrically in relation to the bottom plates, additional pin connections can be arranged, preferably between the beams extending along the sides of the plates.

What is claimed is:

1. A transport system comprising: a track, a sliding carriage movable along the track for transporting heavy loads in a substantially horizontal direction, said track having a bottom plate positioned loosely on a support capable of bearing heavy loads, said bottom plate having an upper surface designed so as to provide minimum resistance to the movement of the sliding carriage over the upper surface; at least one rod attached to the bottom plate and extending in the longitudinal direction of the transport track; said rod guiding said carriage and removable while a load is present on said bottom plate; a climbing jack intended for moving said sliding carriage; and, means for transferring axial forces arising in said rod to said bottom plate.

2. A transport track according to claim 1, wherein a combined climbing rod and guide rod is provided along each of the longitudinal lateral edges of the bottom plate and leave between them an unbroken slip surface with a maximum area in relation to the width of the bottom plate.

3. A transport track according to claim 1, constructed as a section intended to be connected to similar sections to form a track of desired extension.

4. A transport track according to claim 3, wherein the jacks are intended to push the sliding carriage ahead of them, the section joints between the rods are adapted to transfer compressive forces, and the bottom plates at said joints are connected by yoke-like members adapted to transfer tensile stresses between the different plates.

5. The combination of a sliding carriage to be moved along a transport track for conveying heavy loads in substantially horizontal direction, said transport track comprising, a load bearing bottom plate, at least one guide rod attached to said plate extending in the longitudinal direction of said transport track, a climbing jack intended to move said sliding carriage along said bottom plate, wherein the lower surface of the sliding carriage is designed to provide the least possible friction resistance to the movement of the sliding carriage along the transport track, and the sliding carriage is provided with guide means for co-operation with said rod, said guide means positioned to engage said rod in a non-weight bearing relationship.

6. A sliding carriage according to claim 5, wherein said guide means comprises two guide grooves in parallel with each other, each of which is arranged along one of two opposite lateral edges for co-operation with a transport track comprising a combined climbing rod and guide rod provided along each side.

7. A sliding carriage according to claim 5, wherein said guide means comprises two pairs of guide grooves arranged along its lateral edges, said pairs forming angles with each other to render possible movement of the sliding carriage in two different directions.

* * * * *